Dec. 20, 1955     O. D. HUNN     2,727,847
PROCESS FOR RECOVERING RESINS FROM PETROLEUM FRACTIONS
Filed May 16, 1952
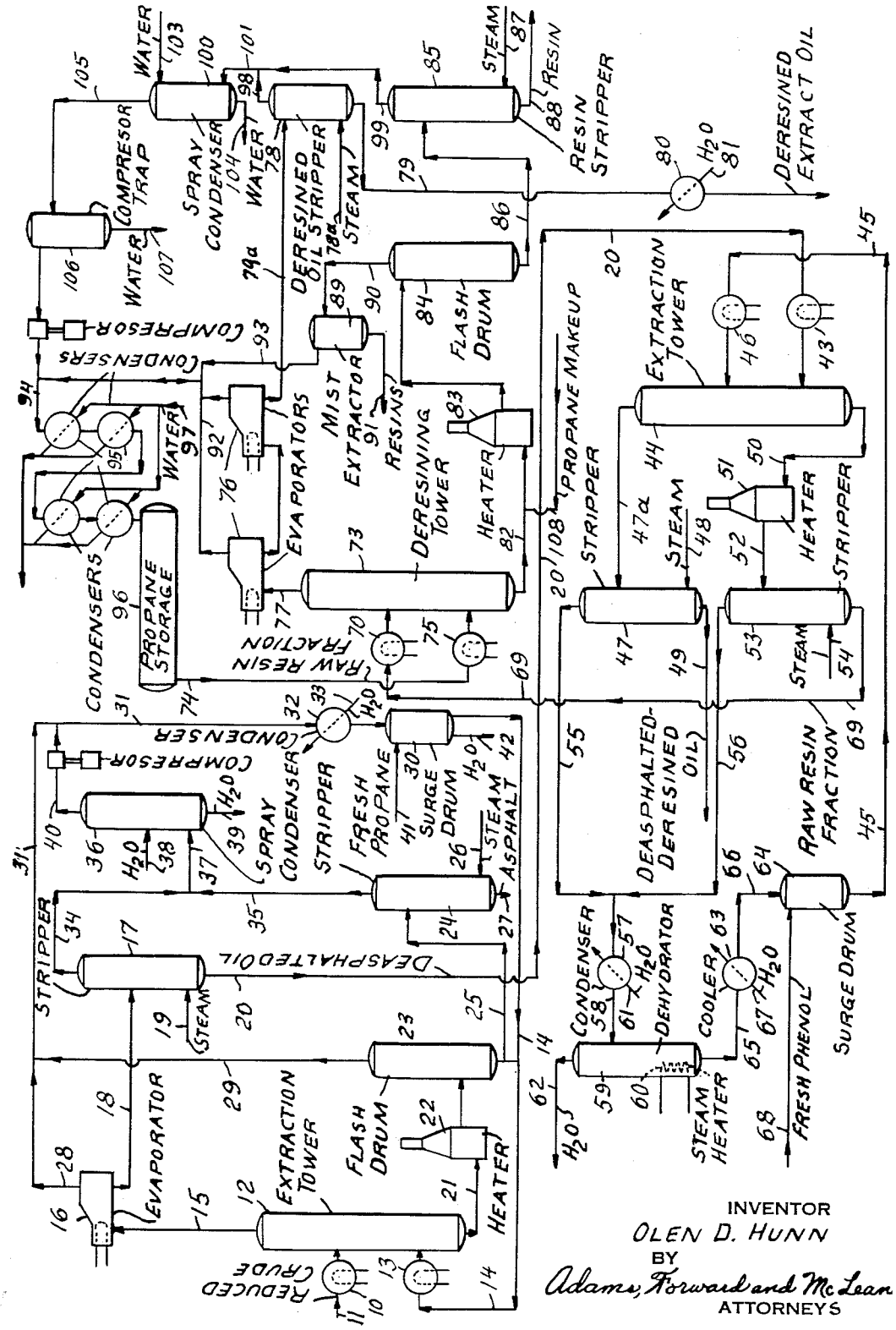
INVENTOR
OLEN D. HUNN
BY
Adams, Forward and McLean
ATTORNEYS

United States Patent Office 2,727,847

Patented Dec. 20, 1955

2,727,847

PROCESS FOR RECOVERING RESINS FROM PETROLEUM FRACTIONS

Olen D. Hunn, Pasadena, Tex., assignor to Sinclair Refining Company, New York, N. Y., a corporation of Maine Application May 16, 1952, Serial No. 288,135

2 Claims. (Cl. 196—14.15)

My invention relates to the recovery of specialized resinous compositions from heavy residual by-products of conventional petroleum refinery deasphalting and solvent extraction operations. More particularly it provides a method for recovering valuable high viscosity aromatic resins from raw resinous petroleum fractions.

In refining residual stocks derived from asphaltic or mixed base crudes, particularly in lubricating oil production, it is conventional to treat or deasphalt the residual stock by contacting it with a precipitant such as liquid propane in order to precipitate asphalt, asphaltenes, and relatively high molecular weight materials. The deasphalted oil is a relatively clean stock of enhanced paraffinicity. The deasphalted oil may be subjected to the usual solvent extraction refining methods to produce high viscosity index lubricating oil stocks. In this operation deasphalted oil is contacted with a selective solvent such as phenol, furfural, nitrobenzene, cresylic acid, etc., which extracts the more aromatic components from the oil and produces a raffinate of substantially enhanced paraffinicity. The extract oil is a viscous oil or raw resin fraction of low viscosity index. Although proposals for utilizing the extract oil have been made it has found little commercial use and ordinarily is disposed of as refinery fuel or as a blend in thermal cracking stocks. I have now devised a sequential process which includes deasphalting a residual petroleum stock, subjecting the deasphalted oil to solvent extraction with a solvent having high selectivity for aromatics, and fractionating the separated extract oil or raw resin fraction with propane. Valuable aromatic resins having viscosities upwards of 2000 S. S. U. at 210° F. are produced. The resins are of unusual aromaticity and tackiness and may be used with advantage as paper laminates, in adhesive compositions, or in protective coatings.

According to my invention, a raw resinous fraction obtained by contacting a propane deasphalted residual petroleum stock with a selective solvent such as phenol having high selectivity for aromatic components is contacted with propane at an elevated temperature below the critical temperature under superatmospheric pressure sufficient to maintain the solvent in liquid phase. The two resulting liquid phases are separated and stripped free of solvent to yield a high viscosity aromatic resin from the propane insoluble phase and a deresined extract oil from the propane soluble phase. Advantageously the propane solvent to raw resin ratio exceeds about 5 to 1, is preferably about 10 to 1, and the raw resin is fractioned at about 100° to 200° F. All three extraction steps may be accomplished either in a continuous countercurrent process or in a batch process.

For example, the reduced crude oil may be contacted with propane at a ratio of propane to oil varying from two to one to as high as ten to one, at a treating temperature usually ranging from 100° to 160° F., depending on the stock to be treated. Since propane is a gas at normal temperature ranges (boiling point −44° F.), the treatment is normally carried out at pressures of the order of 450 p. s. i. to maintain the propane in the liquid state. The resulting propane deasphalted oil may have, typically, a gravity of 22° API and a viscosity at 210° F. of about 150 S. S. U. The deasphalted oil may then be contacted, for example, with phenol at a phenol to oil ratio of from 1:1 to 5:1, depending upon the extent of extraction desired, at a temperature of about 140° to 250° F., with or without a small amount of water. A typical extract oil or raw resin fraction obtained by extracting a deasphalted petroleum stock with phenol has an API gravity of 11.5°, a viscosity of 6787 S. S. U. at 130° F., a viscosity of 337 S. S. U. at 210° F., an O. D. color of 1397, and a carbon residue of 4.176 weight per cent. My method of fractionating the extract oil or raw resin fraction requires contacting the raw resin fraction with commercial propane in liquid phase at a high enough temperature to insure adequate separation, followed by the steps of separating a solvent plus aromatic resin fraction and a solvent plus deresined extract oil fraction and stripping both fractions free of solvent. The yield of aromatic resins having a particular viscosity obtained from a given raw resin fraction appears to depend so far as I am able to determine primarily on the temperature, the propane to feed ratio and the degree of contact obtained in the contacting or extraction step.

The upper temperature, of course, is limited by the critical temperature of propane, i. e., about 206° F. The temperature on the low side is limited by the desirability of producing an aromatic resin of desired viscosity in good yield. By varying treating temperature and solvent ratio, the yield and viscosity of the aromatic resins can be varied over a wide range.

The following three examples more fully explain the effect of varying operating conditions in the raw resin fractionation step upon the yield and properties of the aromatic resins produced.

Example 1

Portions of a raw resin fraction produced by phenol extraction of propane deasphalted oil were intimately contacted in a countercurrent extraction tower with commercial propane at propane to raw resin ratios varying between 8.5 to 8.9:1, at a top tower temperature of 186° to 188.5° F., at a bottom tower temperature of 135° to 139° F., and under sufficient pressure to maintain the propane in a liquid state (about 600 p. s. i. g.). The resulting two phases were separated and stripped free of solvent. Test inspections on the raw resin fraction, the aromatic resins, and the deresined extract oil follow:

|  | Charge Stock | Aromatic Resins | Deresined Oil |
|---|---|---|---|
| Yield, Vol. Percent |  | 35.9–42.0 | 58.0–64.1 |
| Gravity, ° API | 11.5 | 6.0–6.8 | 15.2–16.0 |
| Viscosity, S.S.U./210° F | 337 | 1,882–2,265 | 141–155 |
| OD Color | 1,397 | 3,825–5,478 | 89.25–111.6 |
| Carbon Residue, Percent | 4.176 | 8.174–9.140 | 0.994–1.406 |

Attempts to separate resins by distillation of another portion of the same raw resin stock resulted in a yield of only 25% of 2000 S. S. U. viscosity at 210° F. material. The distilled material was also less tacky and less aromatic than the propane fractionated resin.

Example 2

Another portion of the same raw resin fraction employed in Example 1 was intimately contacted with commercial propane at a propane to raw resin ratio of 8.6 to 1, at a top tower temperature of 157° F., at a bottom tower temperature of 133° F. and under a pressure of 600 p. s. i. g. The resulting two phases were separated and stripped free of solvent. Test inspections on the raw resin fraction, the aromatic resin, and the deresined extract oil were as follows:

|  | Charge Stock | Aromatic Resins | Deresined Oil |
|---|---|---|---|
| Yield, Vol. Percent | | 10.7 | 89.3 |
| Gravity, °API | 11.5 | 3.4 | 12.3 |
| Viscosity, S.S.U./210° F | 337 | 8,132 | 257 |
| OD Color | 1,397 | 17,441 | 4,720 |
| Carbon Residue, Percent | 4.176 | 14.426 | |

Example 3

A portion of a second raw resin fraction of lower viscosity and less aromaticity than that employed in Examples 1 and 2 was intimately contacted with commercial propane at a propane to raw resin ratio of 9.46 to 1, at a top tower temperature of 142° F., at a bottom tower temperature of 118° F., and under a pressure of 460 p. s. i. g. The resulting two phases were separated and stripped free of solvent. Test inspections on this raw resin fraction, the aromatic resin, and the deresined extract oil were as follows:

|  | Charge Stock | Aromatic Resins | Deresined Oil |
|---|---|---|---|
| Yield, Vol. Percent | | 9.5 | 90.5 |
| Gravity, °API | 13.7 | 3.2 | 14.6 |
| Viscosity, S.S.U./210° F | 216 | 5,108 | 168.5 |
| Carbon Residue, Percent | | 15.09 | |

The first set of data indicates that aromatic resins averaging about 2000 S. S. U. viscosity at 210° F. in yield averaging about 40% may be obtained by propane fractionation of a raw resin fraction according to my invention with small variations in process conditions. The second set of data indicates that larger variations in process conditions, for example, a substantial reduction in top tower temperature, results in decreased yields of a much higher viscosity aromatic resin. The third set of data indicates a lower viscosity charge stock of less aromaticity will also yield high viscosity aromatic resins but with correspondingly lower yields.

My invention will now be described with reference to the accompanying drawing which represents a flow diagram of the processes and equipment involved.

A residual stock derived from an asphaltic or mixed base crude is heated in heater 10 in line 11 and introduced into extraction tower 12 where it is contacted with liquid propane from line 14 and heater 13. A deasphalted oil-propane stream is passed overhead from extraction tower 12 to evaporator 16 by means of line 15. The oil is then passed to stripper 17 by means of line 18 where it is steam stripped with steam entering through line 19. The deasphalted oil is removed from stripper 17 by means of line 20. Asphalt containing propane leaves tower 12 by means of line 21 and is passed through heater 22 into flash drum 23. The asphalt is then passed to stripper 24 by means of line 25 where it is steam stripped by steam entering line 26. The stripped asphalt leaves stripper 24 through line 27. Propane leaving evaporator 16 and flash drum 23 through lines 28 and 29 respectively is passed through line 31 and condenser 32 to surge drum 30. Water is passed through condenser 32 by means of line 33. Propane leaving strippers 17 and 24 by means of lines 34 and 35 respectively is passed to spray condenser 36 by means of line 37. Water enters spray condenser 36 by line 38 and is withdrawn through line 39. Propane leaving spray condenser 36 through line 40 is compressed and passed to surge drum 30 through line 31 and condenser 32. Fresh propane is introduced into surge drum 30 through line 41. Water is drained from surge drum 30 by line 42. Propane is recycled to extraction tower 12 from surge drum 30 by line 14.

The deasphalted oil leaving stripper 17 by means of line 20 is passed through heater 43 to extraction tower 44 where it is contacted with phenol from line 45 and heater 46. A raffinate containing deasphalted-deresined oil is passed from extraction tower 44 to stripper 47 by means of line 47a where it is steam stripped with steam entering through line 48. The deasphalted-deresined oil is removed from stripper 47 by means of line 49. An extract oil or raw resin fraction is removed from tower 44 by means of line 50 and passed through heater 51 and line 52 to stripper 53 where it is steam stripped with steam entering through line 54. Phenol leaving strippers 47 and 53 by means of lines 55 and 56 respectively is passed through condenser 57 and line 58 to dehydrator 59 equipped with steam heater 60. Water is passed through condenser 57 by means of line 61. Part or all of the water is stripped from the phenol and removed overhead from dehydrator 59 through line 62. Dry phenol or phenol containing a desired percentage of water is removed from the bottom of dehydrator 59 and is passed through cooler 63 to surge drum 64 by means of lines 65 and 66. Water passes through cooler 63 by means of line 67. Fresh phenol is introduced to surge drum 64 through line 68.

The raw resin fraction leaving stripper 53 by means of line 69 passes through heater 70 to extraction tower 73 where it is contacted with liquid propane from line 74 and heater 75. A deresined extract oil-propane stream is passed overhead from extraction tower 73 to evaporators 76 by means of line 77. The deresined oil is then passed to stripper 78 through line 79a where it is steam stripped with steam entering through line 78a. The deresined oil is removed from stripper 78 by means of line 79 and passed through cooler 80 cooled by water entering line 81. The aromatic resin-propane stream leaves tower 73 by means of line 82 and is passed to heater 83 and to flash drum 84. The resin is then passed to stripper 85 by means of line 86 where it is stripped with steam entering line 87. The stripped resin leaves stripper 85 through line 88. Propane leaving flash drum 84 is passed to mist extractor 89 through line 90 where additional aromatic resins are removed through line 91. Propane leaving evaporators 76 and mist extractor 89 by means of lines 92 and 93 respectively is passed through line 94 and condensing system 95 to propane storage 96. Water is passed through condenser system 95 by means of line 97. Propane leaving strippers 78 and 85 by means of lines 98 and 99 respectively is passed to spray condenser 100 by means of line 101. Water enters spray condenser 100 by means of line 103 and is withdrawn through line 104. Propane leaving spray condenser 100 through line 105 and compressor trap 106 is compressed and passed to propane storage 96 through line 94 and condenser system 95. Water leaves compressor trap 106 through line 107. Propane make-up is introduced to line 82 through line 108.

I claim:
1. In the recovery of aromatic resins from petroleum in which a deasphalted residual stock is contacted with a selective solvent having high selectivity for aromatic components to separate a raw resinous fraction as extract, the improvement which comprises subjecting a mixture consisting essentially of the resulting raw resinous fraction to fractionation at a temperature of about 100° to 200° F. with liquid propane at a propane to raw resin ratio exceeding about 5 to 1, recovering from the propane insoluble phase an aromatic resin having a viscosity upwards of about 2000 S. S. U. at 210° F., and recovering a deresined extract oil from the propane soluble phase.

2. In the recovery of aromatic resins from petroleum in which a deasphalted residual stock is contacted with a selective solvent having high selectivity for aromatic components to separate a raw resinous fraction as extract, the improvement which comprises subjecting a mixture consisting essentially of the resulting raw resinous fraction to fractionation at a temperature of about 100° to 200° F. with liquid propane at a propane to raw resin ratio of about 5 to 10:1, recovering from the propane insoluble phase an aromatic resin having a viscosity upwards of about 2000 S. S. U. at 210° F., and recovering a deresined extract oil from the propane soluble phase.

References Cited in the file of this patent

UNITED STATES PATENTS

| Number | Name | Date |
|---|---|---|
| 2,029,288 | Bray | Feb. 4, 1936 |
| 2,081,496 | Merrill | May 25, 1937 |
| 2,131,205 | Wells et al. | Sept. 27, 1938 |
| 2,143,872 | Forrest et al. | Jan. 17, 1939 |
| 2,143,882 | Keith et al. | Jan. 17, 1939 |
| 2,255,283 | Forrest | Sept. 9, 1941 |